United States Patent
Emery et al.

(10) Patent No.: US 9,513,751 B2
(45) Date of Patent: Dec. 6, 2016

(54) LARGE-FORMAT DISPLAY ASSEMBLY

(71) Applicant: MICROSOFT TECHNOLOGY LICENSING, LLC, Redmond, WA (US)

(72) Inventors: William Loren Emery, Sherwood, OR (US); Bruce Sandmeyer, Portland, OR (US); Isaac S. Frazier, Portland, OR (US); Brian W. Aznoe, Sherwood, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 86 days.

(21) Appl. No.: 14/318,306

(22) Filed: Jun. 27, 2014

(65) Prior Publication Data
US 2015/0378466 A1 Dec. 31, 2015

(51) Int. Cl.
*G02F 1/1333* (2006.01)
*G06F 3/044* (2006.01)
*G09G 5/00* (2006.01)
*G06F 1/16* (2006.01)

(52) U.S. Cl.
CPC .......... *G06F 3/044* (2013.01); *G02F 1/133308* (2013.01); *G06F 1/1601* (2013.01); *G09G 5/003* (2013.01); *G09G 2300/04* (2013.01)

(58) Field of Classification Search
CPC ..... G06F 3/044; G06F 1/1601; G09G 5/003; G09G 2300/04; G02F 1/133308
USPC .......................................................... 349/58
See application file for complete search history.

(56) References Cited

U.S. PATENT DOCUMENTS

| | | | |
|---|---|---|---|
| 7,654,878 B2 | 2/2010 | Morley et al. | |
| 8,427,597 B2 | 4/2013 | Kim et al. | |
| 8,662,692 B2 | 3/2014 | Huang et al. | |
| 2004/0041504 A1* | 3/2004 | Ozolins | G02F 1/1333 313/110 |
| 2004/0189191 A1* | 9/2004 | Ohshita | H01L 51/5284 313/504 |
| 2009/0073080 A1 | 3/2009 | Meersman et al. | |
| 2012/0075885 A1 | 3/2012 | Sampsell | |

(Continued)

FOREIGN PATENT DOCUMENTS

WO 2013063826 A1 5/2013

OTHER PUBLICATIONS

Lu, et al., "Liquid optically clear adhesives for display applications", In 13th International Conference on Electronic Packaging Technology and High Density Packaging, Aug. 13, 2012, 4 pages.

(Continued)

*Primary Examiner* — Charles Chang
(74) *Attorney, Agent, or Firm* — Brandon Roper; Judy Yee; Micky Minhas (57) ABSTRACT

Various embodiments relating to a large-format touch display having a continuous touch surface that is flat and free from visual defects are disclosed. In one embodiment, a display assembly includes a display stacking including a cover sheet having an exterior surface and an interior surface opposing the exterior surface and an image-emitting layer secured to the interior surface, a carriage assembly configured to hold the display stack in a fixed position in the display assembly, and a plurality of fastener pucks positioned adjacent a perimeter of the interior surface of the cover sheet and securing the carriage assembly to the interior surface of the cover sheet via a curable adhesive.

20 Claims, 5 Drawing Sheets

(56) References Cited

U.S. PATENT DOCUMENTS

| | | |
|---|---|---|
| 2012/0266507 A1 | 10/2012 | Pendlebury |
| 2013/0038809 A1* | 2/2013 | Hung ................ G02F 1/133308 349/58 |
| 2014/0176849 A1 | 6/2014 | Lee et al. |

OTHER PUBLICATIONS

Kristiansen, et al., "Overview of Conductive Adhesive Interconnection Technologies for LCD's", In Proceedings of the First IEEE International Symposium on Polymeric Electronics Packaging, Oct. 26, 1997, 10 pages.

ISA European Patent Office, International Search Report and Written Opinion Issued in Application No. PCT/US2015/037560, Sep. 3, 2015, WIPO, 10 pages.

IPEA European Patent Office, Second Written Opinion issued in PCT Application No. PCT/US2015/037560, May 17, 2016, WIPO, 7 pages.

IPEA European Patent Office, International Preliminary Report on Patentability issued in PCT Application No. PCT/US2015/037560, Sep. 5, 2016, WIPO, 14 pages.

* cited by examiner

LARGE-FORMAT DISPLAY ASSEMBLY

SUMMARY

Various embodiments relating to a large-format display having a continuous touch surface that is flat and free from visual defects (e.g., Mura effects) are disclosed. In one embodiment, a display stack includes a cover sheet having an exterior surface and an interior surface opposing the exterior surface and an image-emitting layer secured to the interior surface. A carriage assembly may be configured to hold the display stack in a fixed position in the display assembly. A plurality of fastener pucks may be positioned adjacent a perimeter of the interior surface of the cover sheet and may secure the carriage assembly to the interior surface of the cover sheet via a curable adhesive.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Large-format displays may suffer from various visual defects. For example, a display may suffer from a parallax effect where a perceived location of a displayed object is offset from an actual location of the displayed object. As another example, a display may suffer from a vignetting effect where a light source does not illuminate edge pixels that cause the perimeter of the display to appear dark, especially from off-angle viewing positions. Both visual defects may be generally addressed by reducing a device thickness. More particularly, parallax may be diminished by reducing a distance between an image-emitting layer (e.g., a liquid crystal display (LCD)) and an exterior surface of the display. In one particular example, a thickness of a cover sheet of the display may be reduced to diminish parallax. Further, in implementations where an image-emitting layer includes an LCD, vignetting may be diminished by reducing a distance between a backlight and the LCD.

However, reducing device thickness of a large-format display to address these visual defects may result in susceptibility to various other visual defects. For example, a thin cover sheet of a large-format display may become warped due to mechanical stress applied as a result of mounting the cover sheet in a display assembly. In one particular example, a bezel may be used to clamp a perimeter of a cover sheet to a display assembly. The mechanical stress applied via the clamping may cause the cover sheet to bow or otherwise deform so as not to be flat. In another example, a cover sheet may be bonded to a display assembly using very-high-bond (VHB) tape. However, a thickness of the VHB tape may be substantially thicker than a thickness of the cover sheet, which may cause the cover sheet to deform to the shape of the VHB tape.

Moreover, large-format touch displays may be especially susceptible to some visual defects relative displays that do not detect touch input. In particular, mechanical stress induced by application of touches to an exterior surface may cause visual defects. In one example, a large-format touch display having an image-emitting layer (e.g., LCD, organic light emitting diode (OLED), etc.) configured to form a displayed image may exhibit Mura effects (e.g., a shift in color of the displayed image) responsive to mechanical stress being applied to the image-emitting layer, such as by touches applied to an exterior surface of the touch display. In a particular example, the image-emitting layer may be compressed between components of the display stack and the carriage assembly during a touch input.

The present disclosure relates to a large-format display assembly having a continuous exterior surface that is both flat and free from visual defects while also having a thin form factor. More particularly, the present disclosure relates to an approach for mounting a carriage assembly to an interior surface of a cover sheet of a touch display assembly to hold a display stack in a fixed position in the touch display assembly. In particular, a plurality of discrete fastener pucks may be coupled to the carriage assembly, and the plurality of fastener pucks may be further secure to a perimeter of the interior surface of the cover sheet via a curable adhesive. The plurality of fastener pucks in conjunction with the curable adhesive may act as compliant members in the touch display assembly to absorb mechanical stress and compensate for differences in manufacturing tolerances of the various components of the touch display assembly. In such a configuration, an image-emitting layer may be decoupled from mechanical stress induced by the carriage assembly. Moreover, no mounting features may protrude beyond the perimeter of the interior surface and onto an exterior surface of the cover sheet. In this way, an entirety of the exterior surface of the cover sheet may be exposed and able to receive applied touches. However, in some implementations where the cover sheet is secured to the carriage assembly via the plurality of fastener pucks, one or more components may protrude beyond the perimeter of the interior surface of the cover sheet. For example, a cosmetic bezel may be secured to the exterior surface and/or along the edges of the cover sheet.

The subject matter of the present disclosure is now described by way of example and with reference to certain illustrated implementations. Components that may be substantially the same in two or more implementations are identified coordinately and are described with minimal repetition. It will be noted, however, that components identified coordinately in different implementations of the present disclosure may be at least partly different. It will be further noted that the drawings included in this disclosure are schematic. Views of the illustrated implementations are generally not drawn to scale; aspect ratios, feature size, and numbers of features may be purposely distorted to make selected features or relationships easier to see.

Figure 1:
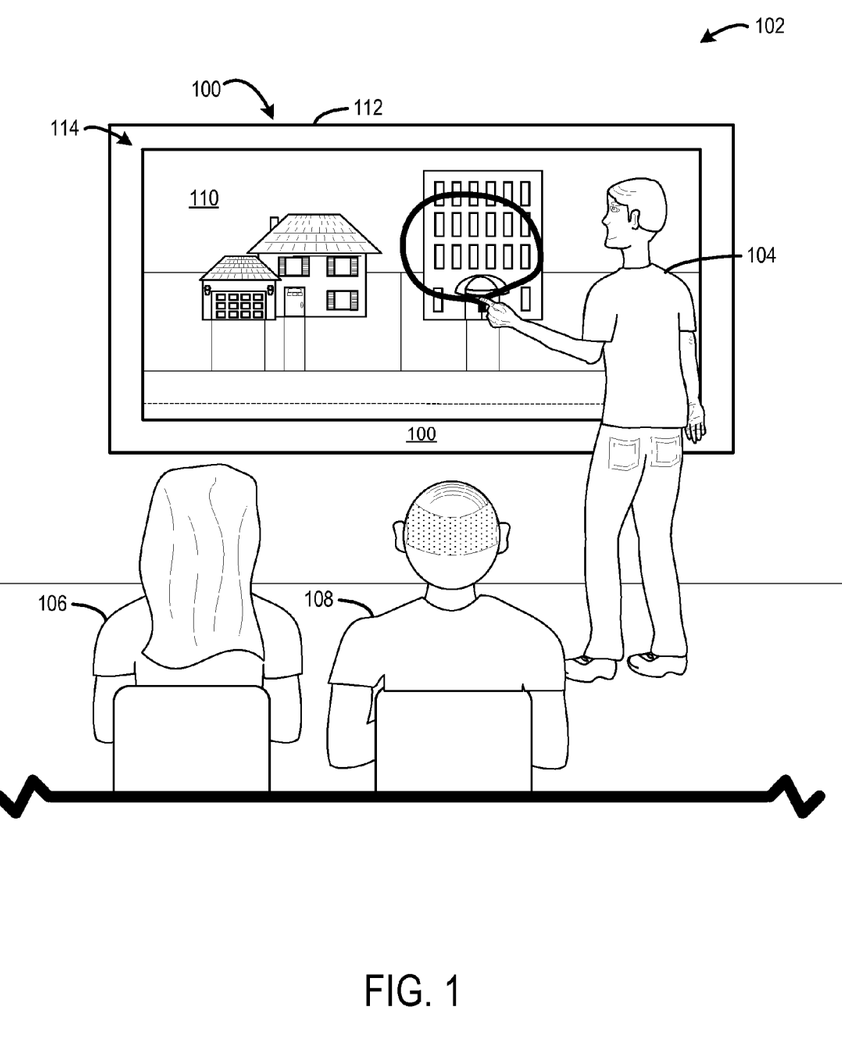
FIG. 1 shows an example large-format touch display.

FIG. 1 shows an example large-format touch display 100 that may be implemented in an interactive environment 102.

The interactive environment 102 may include any suitable location including an office, huddle area, conference room, lounge, classroom, visitor center or another group setting. For example, the touch display 100 may be mounted on a wall, or on a rolling or fixed stand for presentation to a plurality of users, such as users 104, 106, and 108.

The touch display 100 may include a display region 110 that defines an area of an exterior surface 112 through which imagery is displayed. The touch display 100 may be configured to present any suitable imagery including still images, videos, photographs, graphical user interfaces of software applications, video games, and other suitable media content. In some implementations, the touch display 100 may be configured to provide audio content, alone or in conjunction with presented video content.

Figure 2:
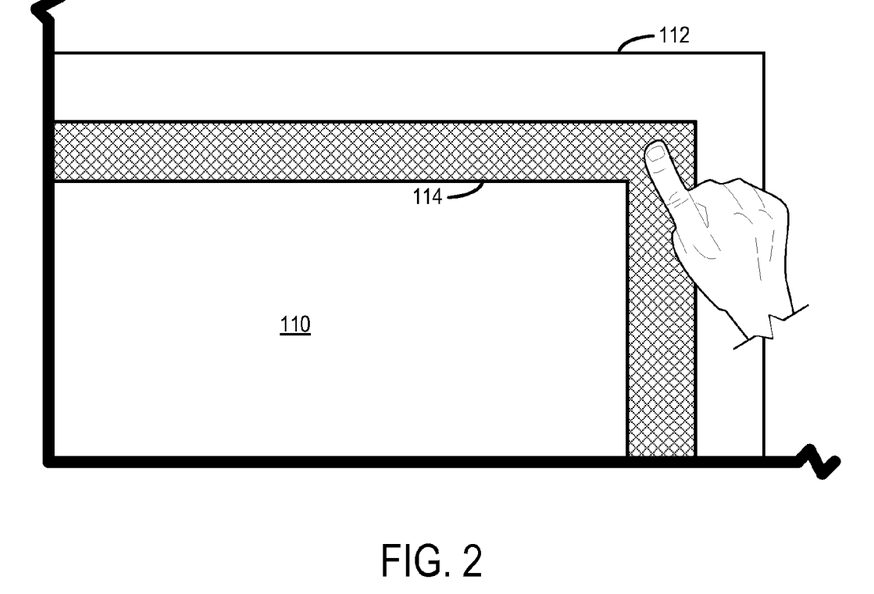
FIG. 2 shows a rear view of an example display assembly that may be implemented in a large-format touch display.

The touch display 100 may include a touch sensor region 114 that defines an area of the exterior surface 112 on which touch input may be detected. In some implementations, the touch sensor region and the display region may be aligned. In other implementations, the touch sensor region 114 may include the display region 110 and extend beyond the display region to allow for expanded touch interaction, such as off-display gestures, hidden menus, and other additional functionality. As one example, shown in FIG. 2, the touch sensor region 114 extends a distance beyond the display region 110 that is equivalent to several finger widths. Such a region size may be suitable to determine a speed, direction, vector, or other parameter of a touch input off the display region. In this implementation, the touch sensor region may not extend to an edge of the exterior surface.

In other implementations, the touch sensor region may extend to an entirety of the exterior surface of the touch display. For example, the touch display 100 may be configured such that an entirety of the exterior surface 112 is exposed to allow applied touches to any portion of the exterior surface. Such a configuration may be referred to as a bezel-less display in which no mounting component of a display assembly extends beyond a perimeter of an interior surface that opposes the exterior surface. In this way, off-display gestures and other touch input may be performed without running into or being blocked by a bezel or other portion of the display assembly. Regardless of whether sensing is provided across the entire front face of the device, it will often be desirable to provide an edge-to-edge glass form factor, for aesthetics and to allow touches to be applied to any portion on the front exterior of the device.

In some implementations, the touch display 100 may be configured to detect multiple temporally overlapping touch inputs (e.g., multi-touch capability) from a plurality of users. In some implementations, the touch display 100 may be configured to associate each touch input with a corresponding user that provided that touch input. Such multi-touch capability may facilitate collaboration, brainstorming, data visualization, and other interactions between the users in a hands-on manner.

It will be understood that the touch display 100 may be any suitable size and/or may have any suitable dimensions. For example, the touch display may have a large-format diagonal viewing size greater than forty inches. Moreover, in some implementations, the large-format display may not have touch input capability. It will be understood that the large-format display may take any suitable form without departing from the scope of the present disclosure.

Figure 3:
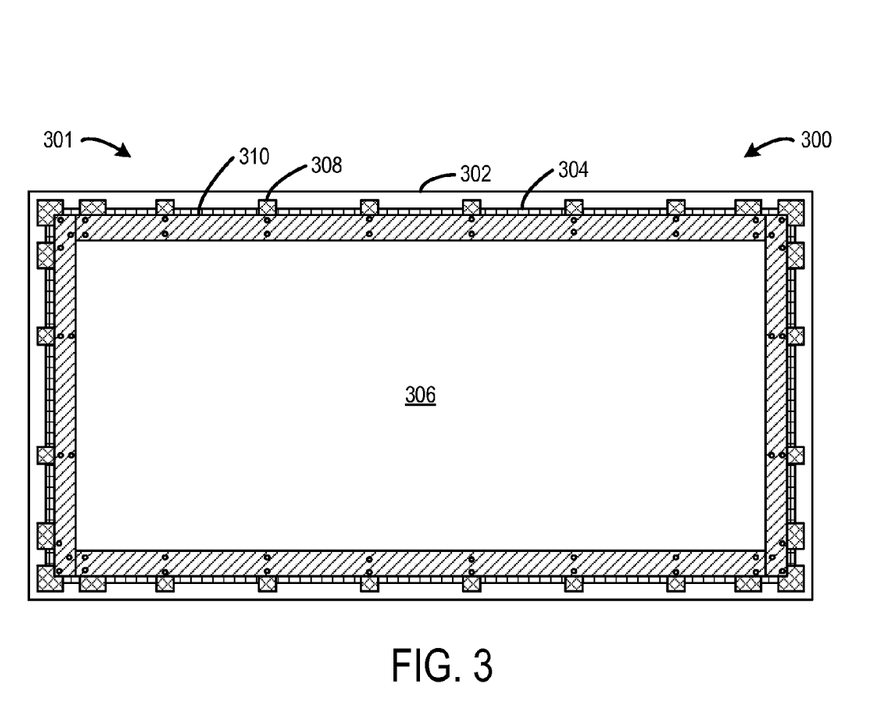
FIG. 3 shows a partial view of a display region of the example display assembly of FIG. 2.

FIG. 3 schematically shows a rear view of an example display assembly 300. For example, the display assembly 300 may be implemented within the touch display 100 of FIG. 1. Note that the display assembly is shown in simplified form. The display assembly may be enclosed in a touch display by a rear cover plate that is omitted in this view to show the individual components of the display assembly.

Figure 5:
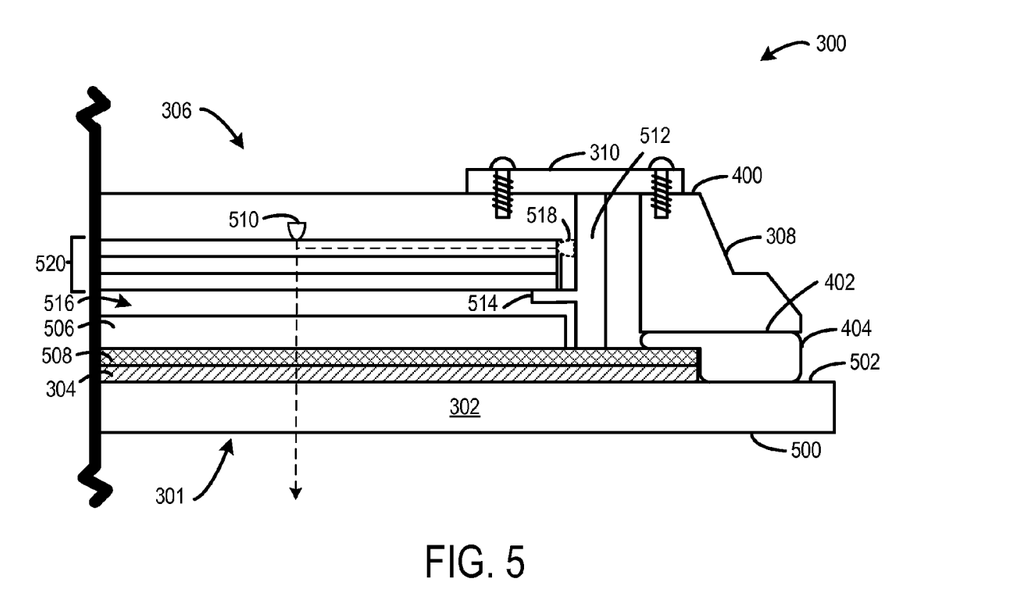
FIG. 5 shows a partial cross-section view of the example display assembly of FIG. 2.

The display assembly 300 includes a display stack 301 including a cover sheet 302, a touch sensor 304, and an image-emitting layer 506 (shown in FIG. 5). The cover sheet 302 has an interior surface that is shown facing out of the page. The cover sheet may include any suitable material. In one example, the cover sheet includes glass. In one particular example, the cover sheet includes alkai-aluminosilicate toughened glass. In another example, the cover sheet includes plastic.

The touch sensor 304 is disposed on the interior surface of the cover sheet 302 via a curable adhesive. The touch sensor 304 may be positioned intermediate the cover sheet 302 and the image-emitting layer 506. The touch sensor 304 may be configured to detect touch input to the exterior surface of the cover sheet 302 that opposes the interior surface. The touch sensor 304 may include any suitable touch sensing technology including capacitive, resistive, optical, and other touch input sensing technologies.

The image-emitting layer 506 (shown in FIG. 5) is bonded to the touch sensor 304 and the cover sheet 302. The image-emitting layer may include any suitable technology to display an image through the cover sheet. In one example, the image-emitting layer includes and LCD. In another example, the image-emitting layer includes an OLED.

A carriage assembly 306 may be configured to hold the display stack 301 in a fixed position in the display assembly. The carriage assembly 306 may be secured to the interior surface of the cover sheet 302 via a plurality of fastener pucks (e.g., fastener puck 308) positioned adjacent a perimeter of the interior surface of the cover sheet. The carriage assembly 306 may provide structural rigidity to the display assembly 300 to reduce the likelihood of deformation of various components that may be of particular concern in large-format display applications where the height and width of a display are substantially greater than a thickness of the display.

Figure 4:
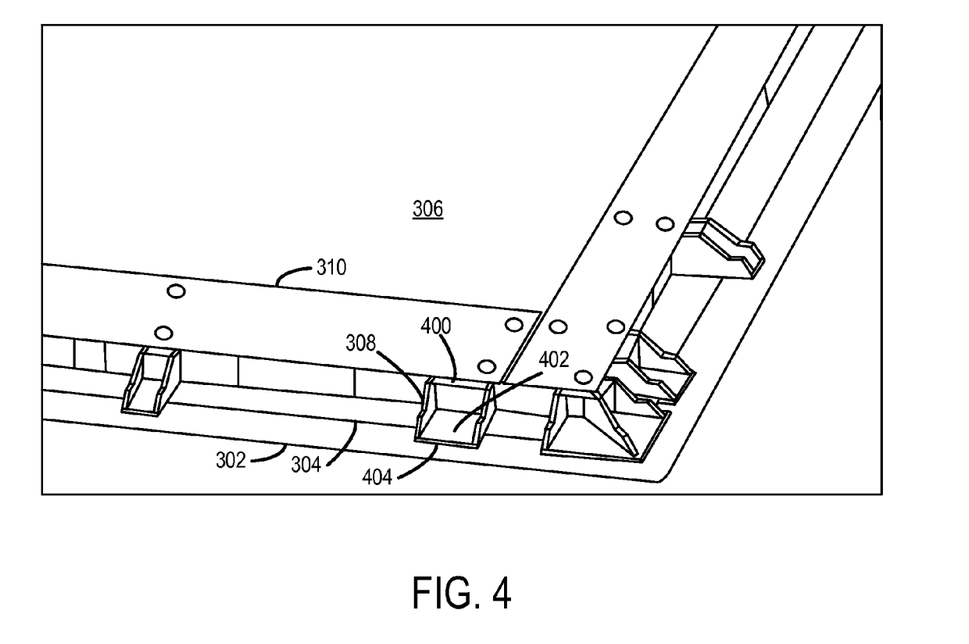
FIG. 4 shows a partial view of the example display assembly of FIG. 2 including a plurality of fastener pucks.

FIG. 4 shows a partial view of the example display assembly 300 that emphasizes the fastener pucks 308. The fastener pucks 308 may be dispersed intermittently around the perimeter of the cover sheet 302. A concentration of fastener pucks 308 may be positioned at the corners of the cover sheet 302 to provide additional support relative to the sides of the cover sheet.

In some implementations, the plurality of fastener pucks 308 may be a uniform size and shape. In some other implementations, the fastener pucks may differ in size and/or shape based on a position at which that fastener puck is mounted on the cover sheet 302. It will be understood that a fastener puck may be any suitable size and/or shape without departing from the scope of the present disclosure.

Furthermore, it will be understood that the fastener pucks may be made of any suitable material. For example, the fastener pucks may be clear plastic, fiber-reinforced plastic, or metal. Clear plastic may be particularly beneficial in implementations where UV-curable adhesive is used to bond the fastener pucks to the cover sheet.

Each fastener puck 308 may include a first portion 400 secured to a first attachment point of the carriage assembly 306. In the illustrated implementation, a mounting bracket 310 is screwed into both the carriage assembly 306 and the fastener pucks 308 to secure the carriage assembly to the fastener pucks. It will be understood that the fastener pucks may be secured to the carriage assembly in any suitable manner. By using a mounting bracket to secure the fastener pucks to the carriage assembly, the backlight may be removed after the fastener pucks have been bonded to the cover sheet for cleaning, repairs, and other reworking. In some implementations, the mounting brackets may be included in or integral with the carriage assembly. In some other implementations, the mounting brackets may be integral with the fastener pucks.

Further, each fastener puck may include a second portion 402 bonded via a curable adhesive 404 to a first attachment point of the interior surface of the cover sheet 302. In some implementations, the fastener pucks may be bonded to both the touch sensor and the interior surface of the cover sheet. In some other implementations, the fastener pucks may be bonded to the touch sensor and not directly to the interior surface of the cover sheet. Still further in some other implementations, the fastener pucks may attach only to the interior of the cover sheet.

The bonded fastener pucks provide mechanical fastening points to the interior surface of the cover sheet so that the carriage assembly may be secured to the cover sheet without any other mounting components protruding beyond the perimeter of the interior surface or wrapping around to the exterior surface of the cover sheet. Accordingly, the touch display may have a continuous glass exterior surface that is aesthetically clean without a having bezel to clamp the carriage assembly to the cover sheet. Moreover, the fastener pucks may allow for design flexibility of the touch display, because the fastener pucks may be bonded to any suitable point on the interior surface of the cover sheet and can be modified at will without modifying the cover sheet. Further, the bonded fastener pucks facilitate scalability of the touch display to any suitable size of display.

The curable adhesive 404 may be configured to cure with a variable thickness to account for puck-to-puck variations between relative positions of the attachment point on the carriage assembly and the attachment point on the interior surface of the cover sheet. In other words, the fastener pucks and the curable adhesive may act as a compliant interface to account for mechanical tolerances and Coefficient of Thermal Expansion (CTE) differences between the carriage assembly and the cover sheet. In particular, the curable adhesive may have the ability to fill both small and large gaps without deforming other resilient components. In contrast, VHB tape would not be capable of compressing or expanding to suitably account for larger variances. As such, using VHB would cause deformation of resilient components or gaps between components.

The curable adhesive 404 may be selected to have a suitable amount of compliance (e.g., modulus of elasticity) relative to the other components of the display assembly to account for such mechanical tolerances. If the curable adhesive is too rigid of an adhesive, then stress may be induced on the cover sheet that may result in warping or deformation. If the curable adhesive is too compliant of an adhesive, then a position of the backlight assembly relative to the cover sheet may creep, especially after long periods of operation in which operating temperatures may be high.

In one example, a modulus of elasticity of the curable adhesive is less than a modulus of elasticity of the plurality of fastener pucks, a modulus of elasticity of the carriage assembly, and a modulus of elasticity of the cover sheet. More particularly, the modulus of elasticity of the curable adhesive may be less than 25% of the modulus of elasticity of the fastener pucks and less than 1% of the modulus of elasticity of the carriage assembly. In one particular example, the modulus of elasticity of the curable adhesive is in a range of 300-400 megapascals (MPa). In contrast, the carriage assembly may include steel and aluminum material that have a modulus of elasticity of 205,000 MPa and 69,000 MPa, respectively. Further, the fastener pucks may have a modulus of elasticity of 2,350 MPa.

It will be understood that any suitable curable adhesive may be used to bond the fastener pucks to the cover sheet. In one example, the curable adhesive is curable by ultraviolet (UV) light. UV curable adhesive may be particularly applicable to large-scale mass production of display assemblies because the time to cure the UV adhesive may be shorter relative to other adhesives, resulting in faster production times. In another example, optically bonded adhesive (e.g., silicone) may be used to bond the fastener pucks to the cover sheet. For example, in contrast to UV curable adhesive, optically bonded adhesive may require 8-12 hours or longer to cure. Other examples of curable adhesive that may be used to bond the fastener pucks to the cover sheet include multi-part epoxy (e.g., two-part epoxy), moisture-cured adhesive (e.g., cyanoacrylates), thermally cured adhesives, etc.

FIG. 5 shows a partial cross-section view of the example display assembly 300 of FIG. 2. The display stack 301 includes the cover sheet 302*k*, the touch sensor 304, and the image-emitting layer 506. The cover sheet 302 includes an exterior surface 500 and an interior surface 502 opposing the exterior surface. The touch sensor 304 may be bonded to the interior surface 502 of the cover sheet 302. The touch sensor 304 may be configured to detect touch input to the exterior surface 500 of the cover sheet 302. The image-emitting layer 506 may be secured to the interior surface 502 of the cover sheet 302 via an optical bond line 508. The image-emitting layer 506 may be configured to modulate light projected through the cover sheet 302. The image-emitting layer 506 may include any suitable image emitting technology. In one example, the image-emitting layer includes an LCD. In another example, the image-emitting layer includes an OLED. In implementations of the display assembly that include a touch sensor, the touch sensor 304 may be positioned intermediate the image-emitting layer 506 and the cover sheet 302 so as to be positioned close to the exterior surface 500 in order to increase touch detection accuracy. In this implementation, the touch sensor may be bonded to the interior surface of the cover sheet, the image-emitting layer may be bonded directly to the touch sensor and indirectly to the interior surface of the cover sheet via the touch sensor. Moreover, the touch sensor 304 may be suitably translucent (e.g., a sensing matrix may be smaller than pixels of the image-emitting layer) so as not to interfere with a displayed image.

The carriage assembly 306 may be configured to align and hold the display stack 301 in a fixed position relative to any suitable component in the display assembly 300. More particularly, in some implementations, the carriage assembly 306 may be configured to hold the image-emitting layer 506 in a fixed position relative to another designated component of the display assembly 300. Example components of the display assembly 300 to which a position of the image-emitting layer may be fixed include the cover sheet, a display region of the cover sheet, an optical stack, a backlight or other light source, a waveguide, a rigid support structure, a mounting bracket, and other suitable components. Further, the carriage assembly 306 may be configured to space other components apart from the image-emitting layer in order to prevent the image-emitting layer from being compressed, such as due to forces applied by touch inputs to the exterior surface of the cover sheet.

In one particular example implementation where the image-emitting layer includes a LCD, the carriage assembly 306 may include a backlight 510 and an alignment chassis 512 configured to align and hold the backlight 510 in a fixed position relative to the LCD 506. In particular, the alignment chassis 512 includes a shelf 514 to hold the backlight 510. The shelf 514 may be spaced a distance from the interior surface 502 of the cover sheet 302 that is greater than a thickness of the LCD 506 such that neither the shelf nor the backlight 510 contact the LCD. In some implementations, the shelf 514 may be spaced apart from the LCD 506 to create a gap 516 between the LCD and the backlight 510. Accordingly, even if the LCD 506 is temporarily deformed via mechanical stress applied by a touch input, the LCD will still not be compressed by the backlight 510. It will be appreciated that the shelf may be positioned as close to the LCD as possible while accounting for manufacturing tolerances in a thickness of the LCD. Moreover, a thickness of the shelf may be minimized while accounting for the shelf to be strong enough to hold the backlight. Accordingly, off-axis vignetting effects may be reduced or eliminated from the touch display.

The alignment chassis 512 may surround a perimeter of the backlight assembly 306. The alignment chassis 512 may sit on the interior surface 502 of the cover sheet 302 (and/or touch sensor). In some implementations, the alignment chassis is not secured directly to the cover sheet. Rather, the alignment chassis may be held in contact (without bonding) with the cover sheet and/or touch sensor via the use of the fastener pucks. The alignment chassis may be used/configured to set the height of other components of the backlight assembly relative to LCD 506, so as to ensure that those components do not come into contact with the LCD.

The backlight 510 may be configured to emit light through the LCD 506 and the cover sheet 302. In some implementations, the backlight may be a rear-mounted backlight 510 configured to emit light straight through the LCD 506 and the cover sheet 302. In one example, the rear-mounted backlight is a light emitting diode (LED) array. In some implementations, the backlight may be an edge-mounted backlight 518 mounted along the perimeter of the backlight assembly 306. Light emitted by the edge-mounted backlight may be directed by a light guide of an optical stack 520 through the LCD 506 and the cover sheet 302. In on example, the edge-mounted backlight may include an edge-lit LED array.

Continuing with the example LCD implementation, the carriage assembly may include an optical stack 520 configured to modify and direct light emitted by the backlight 510 through the LCD 506. The optical stack 520 may be positioned intermediate the backlight 510 and the LCD 506 and held by the shelf 514 of the alignment chassis 512. In one example, the optical stack 520 may include a light guide, a diffuser layer, and a polarizer layer. The light guide may be configured to direct light emitted from the backlight to an entirety of the LCD. The diffuser layer may be configured to scatter light evenly across the entirety of the LCD to provide uniform brightness. The polarizer layer may be configured to filter light to provide light having a uniform polarization to the LCD. It will be understood that the optical stack may include any suitable layer configured to modify light without departing from the scope of the present disclosure.

The fastener puck 308 may be positioned adjacent a perimeter of the interior surface 502 of the cover sheet 302. Further, the fastener puck 308 may be positioned intermediate the perimeter of the cover sheet 302 and the carriage assembly 306. The fastener puck 308 may secure the carriage assembly 306 to the interior surface 502 of the cover sheet 302 via a curable adhesive 404. In particular, the fastener puck 308 includes a first portion 400 and a second portion 402. The first portion 400 may be secured to an attachment point on the carriage assembly 306. In particular, a mounting bracket 310 may be secured to both the fastener puck 308 and the carriage assembly 306 via screws. In some implementations, the fastener puck may be screwed directly into the carriage assembly, and the intermediate bracket may be omitted. In some implementations, the bracket may be integrated into the fastener puck to simplifying the display assembly. However, such a configuration would prevent dis-assembly of the carriage assembly from the cover sheet for reworking, diagnostics, cleaning, repairs, etc.

The second portion 402 of the fastener puck 308 may be secured via the curable adhesive 404 to an attachment point on the interior surface 502 of the cover sheet 302. The curable adhesive may be configured to cure with a variable thickness to account for puck-to-puck variations between relative positions of the attachment point on the carriage assembly and the attachment point on the interior surface of the cover sheet. For example, manufacturing or assembly variations may cause some brackets 310 to be higher relative to the cover sheet than others. Such variations could potentially be 1-2 mm or more. The variable thickness of the adhesive takes up these height variations, as opposed to other attachment mechanisms or methods that might pull/deform portions of the cover glass into non-planar configurations. In some implementations, the curable adhesive may also account for differences in thicknesses between the touch sensor and the cover sheet.

The fastener puck 308 may be positioned to be suitably spaced apart from the alignment chassis 512 so that the curable adhesive is not unintentionally cured to the alignment chassis. Further, the fastener puck 308 may be positioned so as not to extend beyond the perimeter of the interior surface 502 of the cover sheet 302. In some implementations, the fastener puck may be positioned completely on the touch sensor. In some implementations, the fastener puck may be positioned completely on the interior surface of the cover sheet. In some implementations, the fastener puck may be positioned on both the touch sensor and the interior surface of the glass cover sheet. In such an implementation, the difference in height between the two layers may be compensated for by the curable adhesive.

Figure 6:
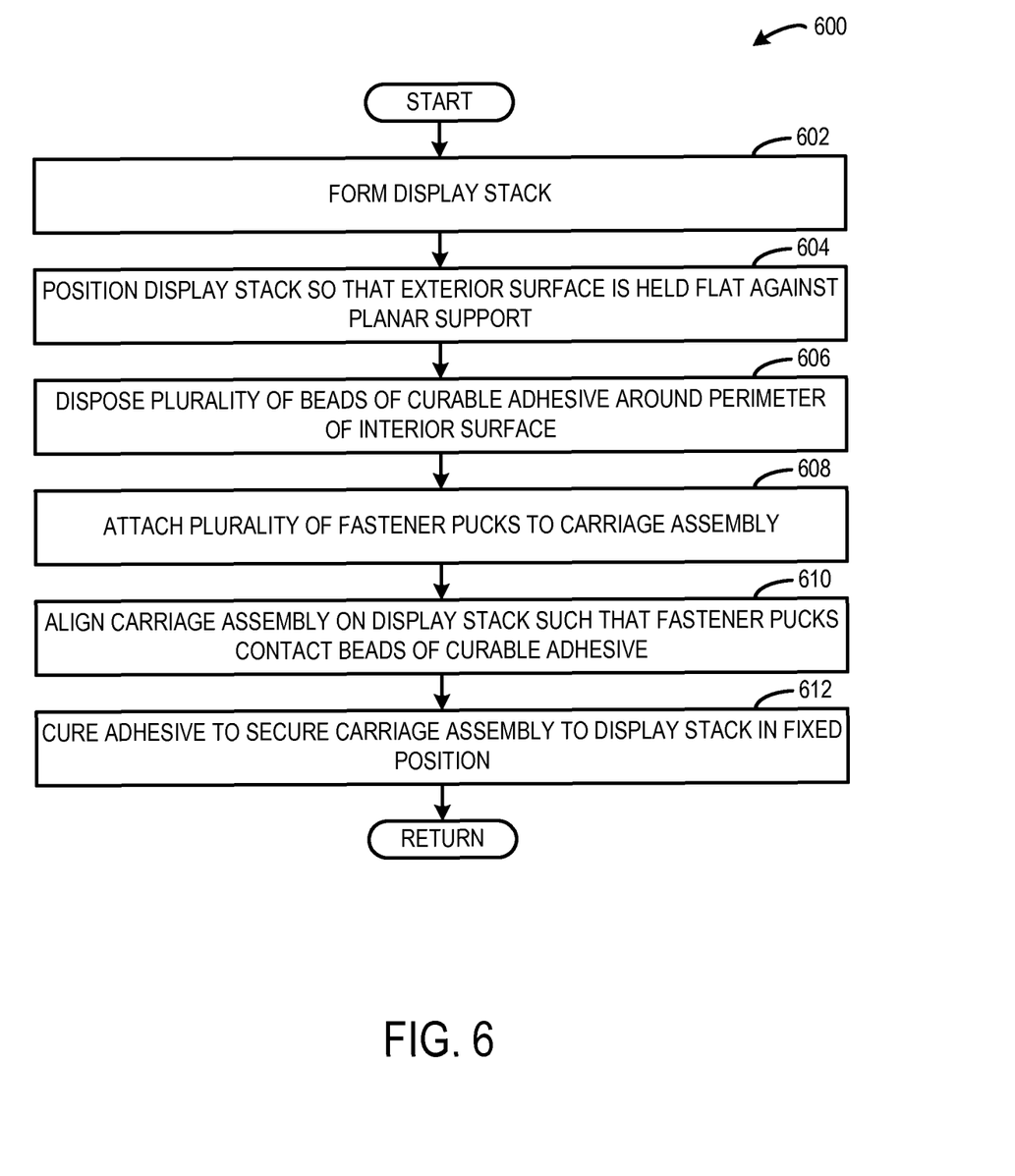
FIG. 6 shows an example method for assembling an example display assembly.

FIG. 6 shows an example method 600 for assembling a display assembly, such as the display assembly 300 shown in FIG. 5. It will be understood that the method 600 is merely one example approach and the display assembly may be constructed in any suitable manner. The method 600 may beneficially facilitate scaling construction of the display assembly up to high volume manufacturing. Moreover, such a construction method may allow for the display assembly, and more particularly, the cover sheet, to be held very flat during the construction process.

At 602, the method 600 may include forming a display stack. In one example, the display stack may include a cover sheet, a touch sensor, and an image-emitting layer. In one example, the display stack may be bonded together via an optical adhesive.

At 604, the method 600 may include positioning the display stack so that an exterior surface of the cover sheet is held flat against a planar support. In one example, the planar support may include a flat horizontal fixture plate, and the exterior surface of the cover sheet may be placed "face" down on the fixture plate. Accordingly, the display stack and the display assembly will lay flat against the fixture plate due to gravity during the construction process.

At 606, the method 600 may include disposing a plurality of beads of curable adhesive around a perimeter of the interior surface of the cover sheet (and/or touch sensor). In particular, a curable adhesive may be dispensed at the fastener puck mounting locations around the perimeter of the cover sheet. The adhesive "bead" may be thick enough that it can accommodate part-to-part tolerances in the display assembly. In particular, the use of a gel adhesive allows the adhesive to conform to different gap thicknesses and angular misalignments, allowing the cover sheet to conform to the flat manufacturing surface rather than exhibiting non-planar deformities that could otherwise result.

At 608, the method 600 may include attaching a plurality of fastener pucks to a carriage assembly. For example, the fastener pucks may be secured to the carriage assembly via brackets and screws.

At 610, the method 600 may include aligning the carriage assembly onto the display stack, so that the fastener pucks contact the adhesive beads even when different parts at tolerance extremes are used. In one particular example, an alignment chassis of the carriage assembly may be aligned with an LCD of the display stack so that a backlight may be supported around a perimeter by the alignment chassis. Accordingly, mechanical stress from the backlight may not be applied to the LCD.

At 612, the method 600 may include curing the adhesive to secure the carriage assembly in a fixed position relative to the display stack. In implementations where UV-cured adhesive is applied to the cover sheet and the fastener pucks are made of clear polycarbonate, UV light may be applied using a UV lamp through the fastener pucks to cure the adhesive.

The above described assembly method enables the display assembly to be constructed while maintaining the display stack in a very flat position. In this way, a likelihood of the display stack being deformed during construction may be reduced. Further, the above described assembly method allows for dis-assembly and re-work of the display assembly even after the adhesive has cured, by removing and reinstalling screws in the brackets that fasten the carriage assembly to the fastener pucks.

In another example, this construction method may be performed with the display assembly oriented vertically and hanging on a fixture plate that includes alignment posts. In this implementation, vacuum force may be applied to hold the display assembly flat.

Figure 7:
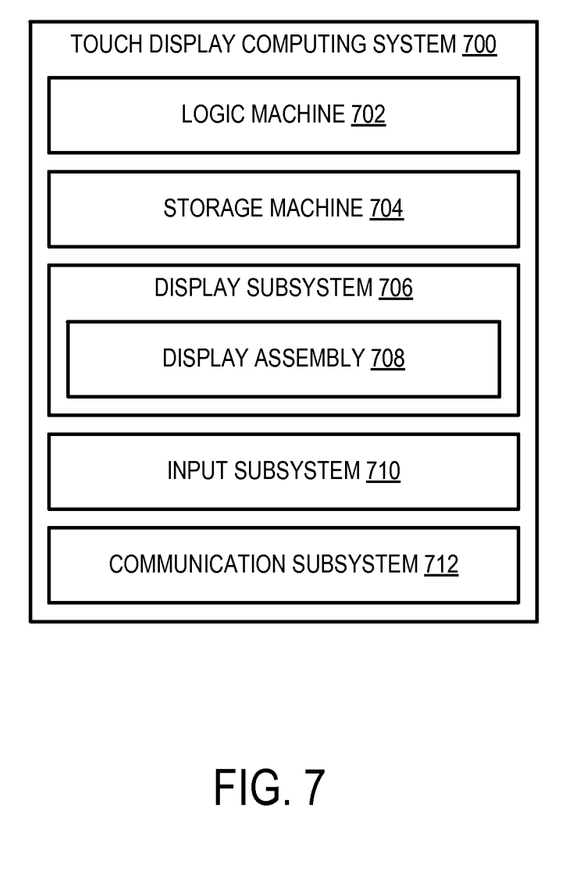
FIG. 7 schematically shows an example touch display computing system.

In some embodiments, the display assembly described herein may be tied to a computing system of one or more computing devices. FIG. 7 schematically shows a non-limiting embodiment of a computing system 700 in which a display assembly 708 may be included. Computing system 700 is shown in simplified form. Computing system 700 may take the form of one or more personal computers, large-format all-in-one computers, home-entertainment computers, network computing devices, gaming devices, and/or other computing devices.

Computing system 700 includes a logic machine 702 and a storage machine 704. Computing system 700 may include a display subsystem 706 including the display assembly 708, input subsystem 710, communication subsystem 712, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein, such as detecting touch input, recognizing touch gestures, displaying imagery, etc. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include the display assembly 708 various examples of which are described herein. Such a display assembly may be combined with logic machine 702 and/or storage machine 704 in a shared enclosure.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 712 may be configured to communicatively couple computing system 700 with one or more other computing devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A display assembly, comprising:
a display stack including a cover sheet having an exterior surface and an interior surface opposing the exterior surface and an image-emitting layer secured to the interior surface of the cover sheet and configured to modulate light projected through the cover sheet;
a carriage assembly configured to align and hold the display stack in a fixed position in the display assembly without being secured to the image-emitting layer; and
a plurality of fastener pucks positioned adjacent a perimeter of the interior surface of the cover sheet and securing the carriage assembly to the interior surface of the cover sheet via a curable adhesive.

2. The display assembly of claim 1, where each fastener puck includes a first portion and a second portion, the first portion being secured to an attachment point on the carriage assembly, the second portion being secured via the curable adhesive to an attachment point on the interior surface of the cover sheet, where the curable adhesive is configured to cure with a variable thickness to account for puck-to-puck variations between relative positions of the attachment point on the carriage assembly and the attachment point on the interior surface of the cover sheet.

3. The display assembly of claim 1, where each of the plurality of fastener pucks do not extend beyond the perimeter of the interior surface of the cover sheet.

4. The display assembly of claim 1, further comprising:
a touch sensor disposed intermediate the image-emitting layer and the interior surface of the cover sheet, the touch sensor being configured to detect touch input to the exterior surface of the cover sheet.

5. The display assembly of claim 4, where the cover sheet includes a display region, where the image-emitting layer aligns with the display region to emit light through the display region, and where the touch sensor extends along the interior surface of the cover sheet beyond a perimeter of the display region to detect touch input to the exterior surface of the cover sheet beyond the display region.

6. The display assembly of claim 3, where the display assembly is configured such that an entirety of the exterior surface is exposed to allow applied touches to any portion of the exterior surface.

7. The display assembly of claim 1, where the image-emitting layer includes a liquid crystal display (LCD) and the carriage assembly includes a backlight configured to emit light through the LCD and an alignment chassis having a shelf to hold the backlight, the shelf being spaced a distance from the interior surface of the cover glass that is greater than a thickness of the LCD such that neither the shelf nor the backlight contact the LCD.

8. The display assembly of claim 1, where the image-emitting layer includes an organic light emitting diode (OLED).

9. The display assembly of claim 1, where the curable adhesive is curable by ultraviolet (UV) light.

10. A method of assembling a display assembly, comprising:
forming a display stack including a cover sheet having an interior surface and an exterior surface that opposes the interior surface and an image-emitting layer secured to the interior surface;
positioning the display stack so that the exterior surface of the cover sheet is held flat against a planar support;
disposing a plurality of beads of curable adhesive around a perimeter of the interior surface of the cover sheet;
attaching a plurality of fastener pucks to a carriage assembly, the carriage assembly being configured to align and hold the display stack in a fixed position in the display assembly;
aligning the carriage assembly in a position relative to the display stack so that the fastener pucks are brought into contact with the plurality of beads of curable adhesive; and
curing the beads of curable adhesive to secure the carriage assembly to the interior surface of the cover sheet without securing the carriage assembly to the image-emitting layer.

11. The method of claim 10, where forming the display stack includes disposing a touch sensor between the image-emitting layer and the cover sheet of the di splay stack.

12. The method of claim 11, where the touch sensor is disposed so as to extend beyond a perimeter of a display region of the cover sheet through which light is to be emitted by the image-emitting layer, such that the touch sensor is configured to detect touch input to the exterior surface of the cover sheet beyond the display region.

13. The method of claim 10, where curing the beads of curable adhesive includes curing the beads with a variable thickness to account for puck-to-puck variations between relative positions of an attachment points on the carriage assembly and an attachment point on the interior surface of the cover sheet.

14. The method of claim 10, where aligning the carriage assembly includes positioning the plurality of fastener pucks so as not to extend beyond the perimeter of the interior surface of the cover sheet.

15. The method of claim 10, where the image-emitting layer includes a LCD.

16. The method of claim 10, where the image-emitting layer includes an OLED.

17. The method of claim 10, where the plurality of fastener pucks are at least partially transparent and the curable adhesive is an ultraviolet light-cured adhesive.

18. A touch-display assembly, comprising:
a cover sheet including an exterior surface and an interior surface opposing the exterior surface;
a touch sensor disposed on the interior surface of the cover sheet, the touch sensor being configured to detect touch input to the exterior surface of the cover sheet;
a LCD secured to the touch sensor and configured to modulate light projected through the cover sheet;
a backlight assembly including a backlight configured to emit light through the LCD and the cover sheet, the backlight assembly further including an alignment chassis configured to align and hold the backlight in a position relative to the LCD without being secured to the LCD; and
a plurality of fastener pucks positioned adjacent a perimeter of the interior surface of the cover sheet and securing the backlight assembly to the interior surface of the cover sheet via a curable adhesive, each fastener puck including a first portion and a second portion, the first portion being secured to an attachment point on the backlight assembly, the second portion being secured via a curable adhesive to an attachment point on the interior surface of the cover sheet, where the curable adhesive is configured to cure with a variable thickness to account for puck-to-puck variations between relative positions of the attachment point on the backlight assembly and the attachment point on the interior surface of the cover sheet, and where the fastener puck does not extend beyond the perimeter of the interior surface of the cover sheet.

19. The touch-display assembly of claim 18, where an entirety of the exterior surface is exposed to allow applied touches to any portion of the exterior surface, where the cover sheet includes a display region, where the LCD and the backlight align with the display region to emit light through the display region, and where the touch sensor extends along the interior surface of the cover sheet beyond a perimeter of the display region to detect touch input to the exterior surface of the cover sheet beyond the display region.

20. The touch-display assembly of claim 18, where the alignment chassis includes a shelf to hold the backlight, the shelf being spaced a distance from the interior surface of the cover glass that is greater than a thickness of the LCD such that neither the shelf nor the backlight contact the LCD.

\* \* \* \* \*